United States Patent
Kennedy et al.

(10) Patent No.: US 10,430,656 B2
(45) Date of Patent: *Oct. 1, 2019

(54) ANALOG UTILITY METER READING

(71) Applicant: UTILITY METER READER, LLC, Dublin, OH (US)

(72) Inventors: James L. Kennedy, Columbus, OH (US); Thomas Baird, Columbus, OH (US)

(73) Assignee: UTILITY METER READER, LLC, Dublin, OH (US)

( * ) Notice: Subject to any disclaimer, the term of this patent is extended or adjusted under 35 U.S.C. 154(b) by 195 days.

This patent is subject to a terminal disclaimer.

(21) Appl. No.: 14/867,891

(22) Filed: Sep. 28, 2015

(65) Prior Publication Data

US 2016/0086034 A1  Mar. 24, 2016

Related U.S. Application Data

(60) Continuation-in-part of application No. 14/295,669, filed on Jul. 4, 2014, now Pat. No. 9,147,120, which
(Continued)

(51) Int. Cl.
*G06K 9/00* (2006.01)
*G06T 7/20* (2017.01)
(Continued)

(52) U.S. Cl.
CPC ......... *G06K 9/00671* (2013.01); *G01D 4/008* (2013.01); *G06K 9/342* (2013.01);
(Continued)

(58) Field of Classification Search
CPC . G01D 5/39; G01D 4/006; G01D 7/06; G01F 23/292
See application file for complete search history.

(56) References Cited

U.S. PATENT DOCUMENTS 5,870,140 A    2/1999  Gillberry
6,845,177 B2 *  1/2005  Chiu ..................... G01D 5/39
                                                        340/688
(Continued)

OTHER PUBLICATIONS

Garay, et al. "Overview of a System AMR Based in Computational Vision and Wireless Sensor Network"; IEEE; Publication [online]. 2009 [retrieved May 17, 2016]. Retrieved from the Internet: <URL: https://www.researchgate.net/profile/Jorge_R_Garay/publication224610458_Overview_of_a_system_AMR_based_in_computation_Vision_and_Wireless_sensor_network/links/53f781690cf24ddba7d79dc.pdf>; pp. 1-6 DOI: 10.109/LATINCOM.2009.5305009.
(Continued)

*Primary Examiner* — Tsion B Owens
(74) *Attorney, Agent, or Firm* — Vorys, Sater, Seymour and Pease LLP; Rex W. Miller, II

(57) ABSTRACT

A method and apparatus to read an analog dial utility meter including a plurality of analog dials, where each dial includes a rotating dial indicator is provided. The apparatus is configured to analyze a digital image of the analog dial utility meter to determine a value of each dial of the utility meter. The method comprises receiving a digital image of the analog dial utility meter, and performing one or more processing and analysis steps to determine a meter reading of the utility meter.

14 Claims, 7 Drawing Sheets

Related U.S. Application Data is a division of application No. 13/222,255, filed on Aug. 31, 2011, now Pat. No. 8,786,706.

(51) Int. Cl.

| | |
|---|---|
| *H04L 29/08* | (2006.01) |
| *G06K 9/34* | (2006.01) |
| *G06K 9/38* | (2006.01) |
| *G06T 7/70* | (2017.01) |
| *G06T 7/13* | (2017.01) |
| *G01D 4/00* | (2006.01) |

(52) U.S. Cl.
CPC .............. *G06K 9/38* (2013.01); *G06T 7/13* (2017.01); *G06T 7/20* (2013.01); *G06T 7/70* (2017.01); *H04L 67/00* (2013.01); *G06K 2209/03* (2013.01); *G06T 2207/20024* (2013.01); *G06T 2207/20036* (2013.01); *Y02B 90/247* (2013.01); *Y04S 20/50* (2013.01)

(56) References Cited

U.S. PATENT DOCUMENTS

| | | | |
|---|---|---|---|
| 7,310,052 | B2 | 12/2007 | Bowman |
| 8,144,027 | B2 | 3/2012 | Goldberg et al. |
| 8,594,365 | B2 | 11/2013 | Derkalousdian et al. |
| 2004/0032504 | A1* | 2/2004 | Shan ............... G01D 4/006 348/207.99 |
| 2006/0036967 | A1 | 2/2006 | Crichlow |
| 2006/0045389 | A1* | 3/2006 | Butterworth ........... G01D 4/004 382/321 |
| 2006/0106741 | A1* | 5/2006 | Janarthanan .......... G01D 4/002 705/412 |
| 2007/0008171 | A1 | 1/2007 | Bowman |
| 2007/0057814 | A1 | 3/2007 | Goldberg et al. |
| 2007/0171092 | A1 | 7/2007 | Allgood |
| 2009/0190795 | A1* | 7/2009 | Derkalousdian ......... G06K 9/00 382/100 |
| 2011/0109472 | A1* | 5/2011 | Spirakis ................ G06Q 10/06 340/870.02 |
| 2012/0194683 | A1* | 8/2012 | Goldberg ............... G01D 4/002 348/160 |
| 2012/0284096 | A1* | 11/2012 | Gomes ................... G06Q 30/04 705/14.14 |
| 2014/0286580 | A1 | 9/2014 | Kennedy et al. |

OTHER PUBLICATIONS

International Searching Party, Authorized officer: Shane Thomas; International Search Report and Written Opinion dated Jun. 2, 2016; International Application No. PCT/US16/23945, International Filing Date Mar. 24, 2016; Applicant: Utility Meter Reader, LLC.

\* cited by examiner

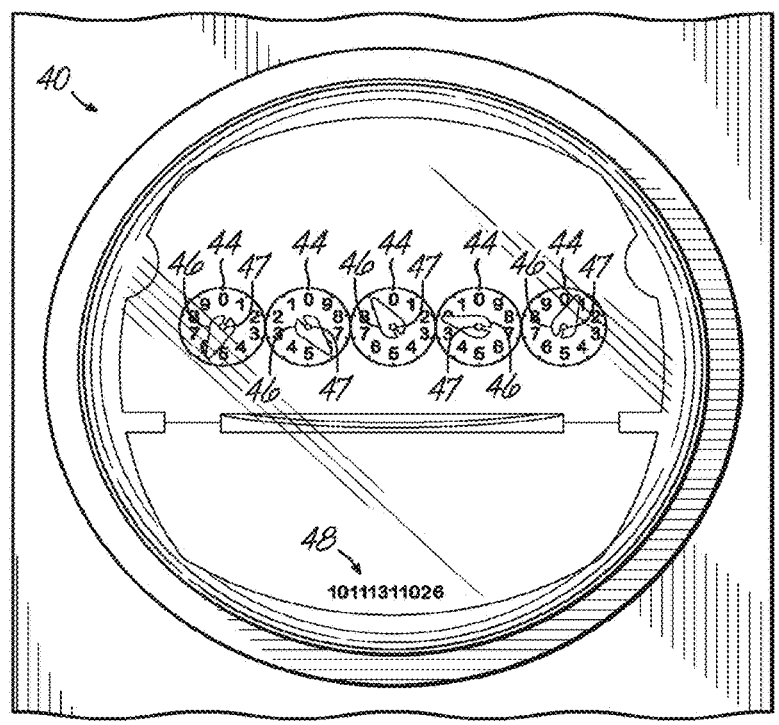
FIG. 2A
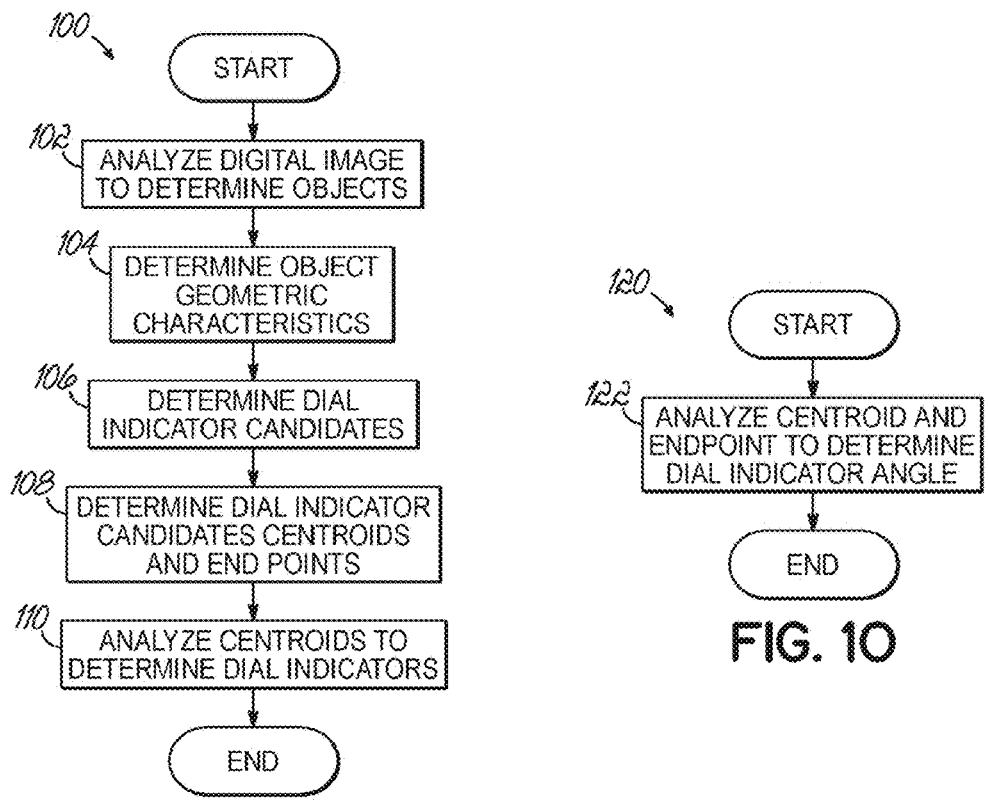
FIG. 9
FIG. 10

ANALOG UTILITY METER READING

CROSS REFERENCE TO RELATED APPLICATIONS

This application is a continuation-in-part of U.S. application Ser. No. 14/295,669 filed Jun. 4, 2014, which is divisional application of U.S. application Ser. No. 13/222,255 filed Aug. 31, 2011, the disclosures of which are hereby incorporated by reference in their entirety.

FIELD OF THE INVENTION

The present invention relates to reading utility meters, and more particularly to obtaining customer-supplied meter readings from utility meters having analog dials with rotatable dial indicators.

BACKGROUND

Utility meters having analog dials are still used in many settings to monitor utility usage of a location (e.g. residence, commercial building, etc.) for natural gas, water, and/or electric. An analog dial utility meter will typically include one or more analog dials, each having a respective dial indicator that rotates to point to different numbers on the dial as the associated utility is consumed. Typically, the utility supplier or its agent hires an individual, referred to herein as a meter reader, to travel to the various locations, view the analog dials, and record the meter readings based on the numbers to which the dial indicators point. The meter reader provides that information back to the utility supplier or agent, so that their server can determine utility usage and manage billings, such as billing the customer for the usage.

In smaller and/or less populated areas, the costs involved in having a meter reader travel to the various customer locations to take the meter reading can be prohibitive. Moreover, in some situations, the meter may be located inside of a structure which is not always readily accessible to the meter reader, thus hampering the meter reader and adding delay and further costs. In such situations, the utility supplier often relies on the customer to view the dials and manually self-report the meter reading based on what the customer sees on the dials. While receiving manually, self-reported utility meter readings from customers provides some savings as compared to having a meter reader travel to each location, cost factors and other problems are often encountered with such customer supplied meter readings.

For example, in one conventional method for customers to manually self-report meter readings, utility meter reading cards are periodically mailed to the customer. The customer is to view the dials and mark in the positions of the respective dial indicators on the card. The completed card is then to be mailed back to the utility supplier or its agent, who must then enter the markings into the computer server to determine utility usage and manage billings. Not only is there the cost of postage, both for mailing the utility meter reading card to the customer and for mailing of the completed card back to the utility supplier, other problems are often encountered. For example, cards can be lost or delayed, customers may make incorrect readings or markings, and in some cases, customers might not complete the card. Another method of manual self-reporting involves the customer calling into an automated system to recite the utility meter reading as discerned from the customer's view of the meter dials. While that serves to eliminate some cost, other difficulties may arise, such as failure of the customer to call in the meter reading or inaccuracies by the customer and/or in the speech recognition process.

SUMMARY OF THE INVENTION

The present invention facilitates easy capture of analog meter readings and analysis thereof by which to simply, economically, and automatically obtain accurate customer-supplied meter readings without the disadvantages encountered with present approaches. To that end, and in accordance with the principles of the present invention, a customer or other individual takes a digital picture of the analog utility meter, specifically including at least the dials thereof, such as with a digital camera. The image received from the digital camera is analyzed by a processor to determine the positions of the respective dial indicators and to define therefrom the value of the dial indicators. The processor is programmed to execute image processing functions which identify the dials from the image, locate the relative angular positions of the dial indicators in the image, and determine therefrom the value of each dial. The determined values constitute a meter reading. The meter reading can then be utilized by the utility provider or its billing agent to determine utility usage and manage billing.

In particularly advantageous embodiments of the invention, the digital picture may be received through a digital camera forming part of a mobile computing device such as a smart phone. In accordance with one aspect of the present invention, a computer application, commonly referred to as an "app," is programmed into the smart phone. Launching that app causes the processor of the smart phone to receive and analyze the image and generate therefrom the meter reading. The meter reading can then be sent, using the communication facility of the smart phone, to a server associated with a utility provider or its agent to determine utility usage and manage billings.

The digital image can also be transmitted with the meter reading for archiving and/or re-analysis as a check, for example, of the meter reading from the smart phone device. Alternatively, the digital image may be sent without analysis to the server where the processor thereof has been programmed to analyze the image and generate the meter reading for use as above. The digital image may also include details identifying the particular utility meter and which details may be used by the utility provider or its agent to confirm that the meter reading is for the specific location.

While the present invention is particularly advantageously applied to and with a smart phone, other embodiments do not necessarily require or involve a smart phone. For example, other mobile computing devices generally considered to be hand-held and having digital imaging and communication capability may be used, such as tablet computers, netbook computers, or the like. Similarly, the digital image can be captured by a stand-alone digital camera, and then transferred to a separate computer, either wirelessly or with a cable. The separate computer could be a customer's computer where the image is processed and the results communicated to the server. Or the computer could be the server, which receives the image from the digital camera or from an intermediary computer such as a customer's computer which itself had received the digital image. In any of these situations, the processor of the computer (whether of the mobile computing device, the customer's computer, and/or the server) may be programmed to analyze the received image.

Most individuals have digital cameras and computers equipped for internet communication. Many also have mobile computing devices, such as smart phones. Thus, deployment and/or implementation of the invention can be readily and economically accomplished to automatically develop and provide customer supplied meter readings, but in a fashion that is so easy to use that compliance is far more likely, with little cost and with significantly less risk of error than encountered with present approaches. For example, with the present invention, the customer does not have to determine the respective positions of the dial indicators, does not have to fill out and mail a card, and does not have to call and report the dial indicator positions verbally. Instead, the customer need merely aim the digital camera at the meter dials and takes a picture thereof in conventional manner. The processor will perform all the necessary analysis to generate, and possibly communicate, the meter reading based on the image received from the digital camera. As a consequence, the drawbacks of prior analog meter reading methods are overcome. More particularly, the foregoing can be readily accomplished without the costs of sending meter readers to the consumer locations, and without the delays, costs, and errors of approaches which involve the consumer manually reading the dials, and completing mailings or voice call-ins. Yet, the consumer can take the digital image and cause or permit it, or the meter reading, as appropriate, to be sent electronically to the server of the utility provider or its billing agent, thereby reducing costs and errors. Nonetheless, in some situations, the utility supplier or its agent may find it beneficial to provide the meter reader(s) with an appropriate programmed mobile computing device to facilitate their meter reading tasks.

By virtue of the foregoing, there is thus facilitated easy capture of analog meter readings and analysis thereof by which to simply, economically, and automatically obtain accurate meter readings without the disadvantages encountered with present approaches. These and other advantages of the present invention will be more readily apparent from the accompanying drawings and description thereof.

BRIEF DESCRIPTION OF THE DRAWINGS

The accompanying drawings, which are incorporated in and constitute a part of this specification, illustrate embodiments of the invention, and together with the general description of the invention given above and the detailed description of the embodiments below, serve to explain the principles of the present invention.

FIG. 2A is an enlarged view of a portion of FIG. 2 showing an exemplary analog utility meter;

FIG. 9 is a flow chart illustrating one example of a sequence of operations executable by the processor of the mobile computing device of FIG. 1 for analyzing the processed digital image to identify dial indicators as part of the sequence of FIG. 3;

FIG. 10 is a flow chart illustrating one example of a sequence of operations executable by the processor of the mobile computing device of FIG. 1 for determining the value of the dial indicators as part of the sequence of FIG. 3;

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and clear understanding.

DETAILED DESCRIPTION OF THE DRAWINGS

Figure 1:
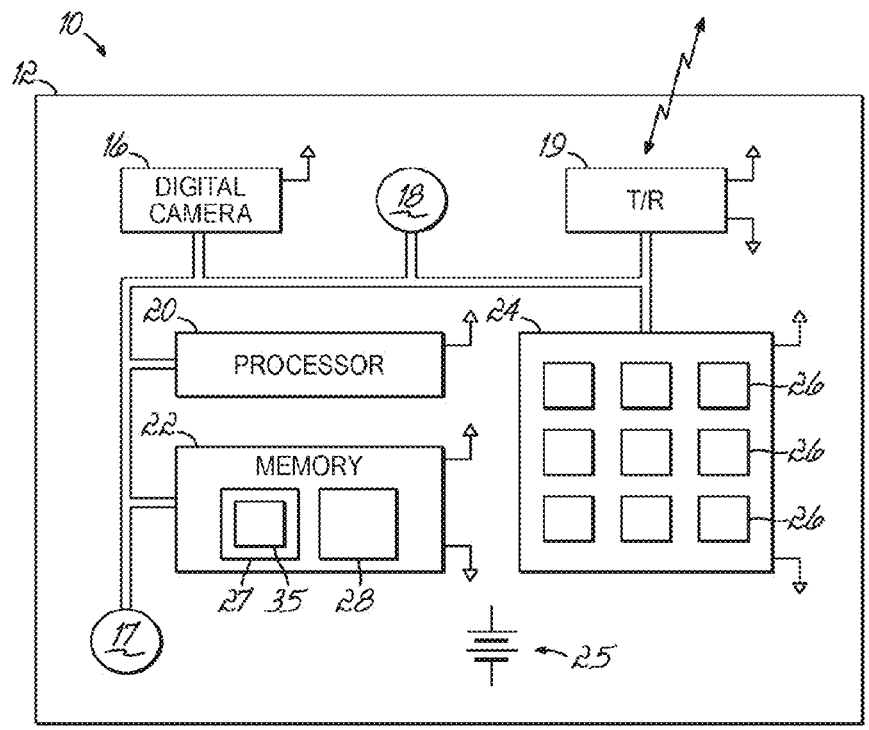
FIG. 1 is a schematic diagram of an exemplary mobile computing device adapted to provide functions by which to receive and analyze digital images of the dials of an analog utility meter to automatically self-report utility usage in accordance with the principles of the present invention.

With reference to FIG. 1, there is shown a schematic view of an exemplary mobile computing device 10 which may advantageously be adapted or used with the present invention. Mobile computing device 10 has a housing 12 sized to be easily held in one hand by an individual 14 (FIG. 2), such as a utility customer or someone acting on the customer's behalf, or a meter reader. One particularly advantageous type of mobile computing device 10 is a smart phone, such as an iPhone or a Droid-based cellular phone by way of examples, the housing 12 of which is sized to be hand-held so as to be easily carried in or with one hand. Mobile computing device 10 will thus be referenced herein as a smart phone, although it will be understood that the mobile computing device 10 could be some other comparable, hand-held device, such as a tablet computer an example of which is the iPad, a netbook computer, or the like.

Figure 2:
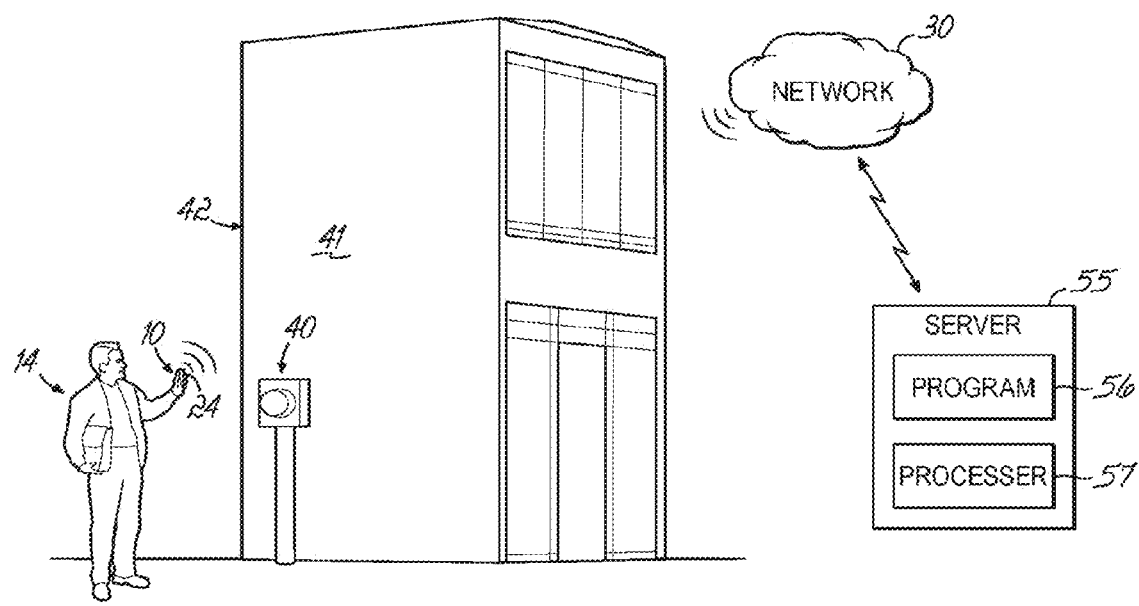
FIG. 2 is a diagrammatic illustration of an individual, such as a utility customer, using the mobile computing device of FIG. 1 to take a digital picture of an analog utility meter dials which results in an image to be analyzed by the processor of the mobile computing device in accordance with the principles of the present invention.

Housing 12 supports the various electronic components of the smart phone 12 operatively interconnected by one or more busses 15. These components include a digital camera 16, a microphone 17, a speaker 18, a transceiver (T/R) section 19, a processor 20, a memory 22, and a display/user interface 24, all as may be standard in a smart phone 10. Housing 12 may also support a battery 25, which may be rechargeable, to provide power to the various electrical components of smart phone 10 such that the smart phone 10 is mobile and self-contained for use. The display/user interface 24 provides images to the user 14, such as icons or other virtual buttons as at 26, or digital images sent to the smart phone 10, or as captured by the digital camera 16 thereof. Similarly, the memory 22 includes various operating programs 27 for operation of the smart phone 10 and a data storage 28. Smart phone 10 may, through its T/R section 19, communicate over a communication network 30 (FIG. 2). The communication network 30 may be provided by a cellular provider, examples of which include Verizon, Sprint, and AT&T. The communication network 30 can be, by way of further example, a Code Division Multiple Access (CDMA) or Global System for Mobile Communications (GSM) network, and may also include an IEEE 802.11 (WiFi) network as all or part thereof. Data may be stored in a data storage 28 of memory 22 by which to facilitate storage and communication of data such as digital images taken by camera 16 or messages, texts, images, and/or web pages received by the smart phone 10 over the communication network 30.

Smart phone 10 may be used in conventional fashion, but for purposes of the present invention, memory 22 may also contain therein an app 35, which may be stored along with other operating programs 27. The app 35 stores various instructions, routines, functions, operations and the like to be executed by the processor 20 to adapt the smart phone 10 to perform as an electronic reader of analog meters 40 (FIG. 2) in accordance with the principles of the present invention. As will be readily appreciated by users of smart phones, the app 35 may be downloaded into the smart phone 10 over the communication network 30, for example, or otherwise loaded into the smart phone 10 wirelessly such as by a WiFi, Bluetooth, or infrared link, or with a cable or other physical link from another computer (not shown) or memory stick or the like having access to the software making up the app 35.

Use of the smart phone 10 with the app 35 activated or launched, such as by tapping on or otherwise selecting the icon 26 on the display/use interface 24 associated with the app 35, for purposes of obtaining a meter reading will now be described with reference to FIG. 2. As seen in FIG. 2, an analog utility meter 40 may be mounted to a wall 41 of a house or other structure 42 to monitor usage of a utility of that structure 42. With further reference to FIG. 2A, which is an enlarged view of a portion of FIG. 2, meter 40 includes a plurality of dials 44 each having a dial indicator 46 which rotates, such as clockwise or counterclockwise (they may all rotate in the same direction, or some may rotate in one direction while others rotate in the other direction) driven by an axial pin 47 of the dial 44 as the utility being metered is used. The angular relationship of each dial indicator 46 correlates to the amount of utility consumed, such as by pointing to respective numbers about the dial 44. The meter 40 typically also includes identifying indicia, such as a serial number or the like as at 48.

With the app 35 activated, the individual 14 holds the smart phone 10 so as to aim the digital camera 16 thereof at the dials 44. An image of what is in the view of the digital camera 14 will typically show in the display/user interface 24. The individual 14 desirably positions the smart phone 10 such that the dials 44 are aligned horizontally across the display/user interface 24 and visible within a bracketed image area (not shown). The user may be prompted by a message on the display/user interface 24 to either tap thereon to take a picture or swipe thereacross to cancel. When the picture is taken, a digital image or picture 52 of the meter 40 as seen in FIG. 2A, including the dials 44 (see FIG. 4) will then typically be stored in the data store 28. The digital image 52 is considered received by the processor 20 of the smart phone 10 when it is taken.

Advantageously, the image 52 includes all of the dials 44 with the respective dial indicators 46 showing their respective angular relationships within each dial 44. The digital image 52 also advantageously, but need not necessarily, includes the meter identifying information 48. When the picture 52 is taken, all or a portion thereof is also typically displayed on display/user interface 24.

The app 35 advantageously includes the necessary program code for the processor 20 to analyze the digital image 52 and generate therefrom a meter reading. The meter reading (with or without the image 52) may be transmitted via the communication network 30 from the smart phone 10 to a server 55, which is used by or on behalf of a utility supplier to determine utility usage, manage billings and/or for other purposes as considered necessary by the utility supplier or its agents. As will be readily understood, the server 55 may communicate with the communication network 30 directly or via other connections, such as telephone lines, other cable connections, the internet, and/or cellular or other wireless connections.

Alternatively, the smart phone 10 may not analyze the digital image 52 but can instead transmit only the digital image 52 to the server 55. The server 55 may contain a program 56 which will cause the processor 57 of the server to analyze the received digital image 52 and generate the meter reading directly generally as described herein as in the case of app 35. Still further alternatively, where the smart phone 10 transmits both the digital image 52 and the meter reading, the processor 57 of the server may analyze the digital image 52 to compare it to the received meter reading as a reliability check. And in either event, the digital image 52 may be evaluated at or by the server 55 in respect of the meter identifying information 48 to confirm that the digital image 52 and/or meter reading are from an expected meter 40.

Figure 3:
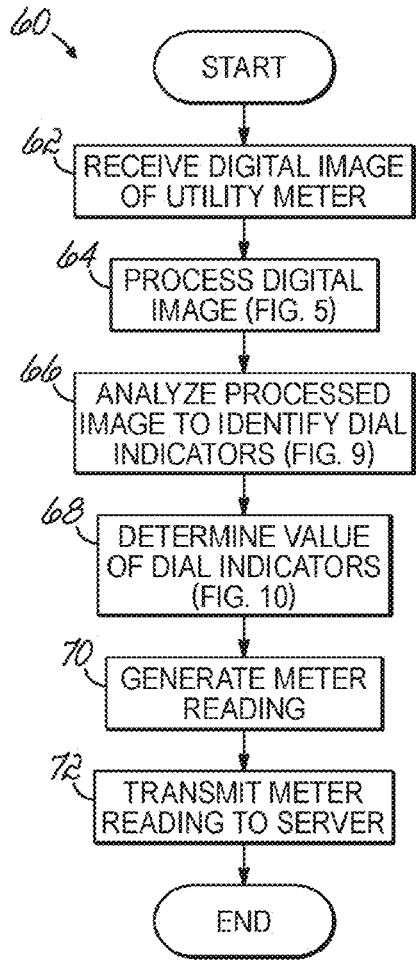
FIG. 3 is a flow chart illustrating a sequence of operations executable by the processer of the mobile computing device of FIG. 1 for analyzing a digital image of the utility meter to automatically generate a meter reading therefrom and transmit same to a server of a utility provider or its agent in accordance with the principles of the present invention.
Figure 4:
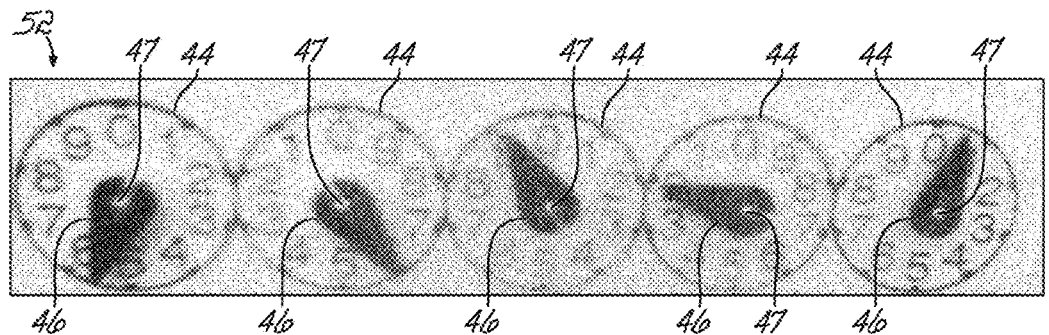
FIG. 4 is a plan view of a portion of a received digital image showing the dials of the utility meter.

An exemplary process 60 which may be performed by the processor 20 utilizing the program code of the app 35 is shown in FIG. 3. That process 60 starts at block 62 by receiving the digital image 52 of the meter 40, and particularly including the dials 44 thereof such as by taking the picture of the meter 40 with the digital camera 16 as above described. That portion of the image 52 including the dials 44 as received is shown in FIG. 4. Next, the digital image 52 is processed at block 64, and is then analyzed at block 66 to identify the dial indicators 46 from within the image 52. Once identified, the dial indicators 46 are analyzed at block 68 to determine the values thereof, such as by determining their respective angular rotation in order to determine what number each is actually pointing to in the dials 44. The results from block 68 are used at block 70 to generate the meter reading, which is in its simplest form, the string of numbers corresponding to the numbers indicated by each dial indicator 46 as determined from block 68. The meter reading may then be transmitted to the server 55 at block 72 whereupon the process 60 may end.

As known by those skilled in the art, a digital image, such as image 52, comprises a plurality of pixels of varying intensity values, where the intensity value of a pixel corresponds to the color of the pixel. The digital image 52 of the dials 44 of the utility meter 40 may include a plurality of objects, where each object comprises a subset of pixels of the plurality of pixels of the digital image, and some of the objects may correspond to the dial indicators 46, and other objects will be objects not needed for determining a meter reading. As such, image processing functions may be used at blocks 64 and 66 to identify those objects which are dial indicators 46.

Figure 5:
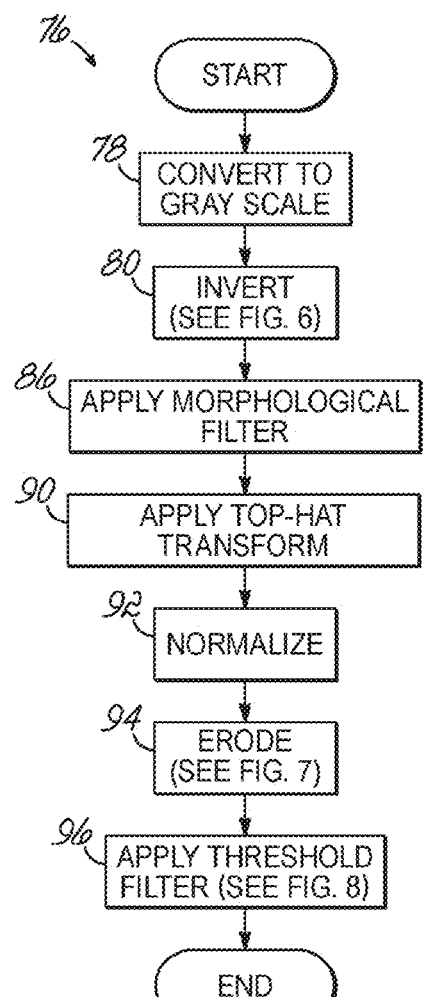
FIG. 5 is a flow chart illustrating one example of a sequence of operations executable by the processor of the mobile computing device of FIG. 1 for processing the digital image as part of the sequence of FIG. 3.
Figure 6:
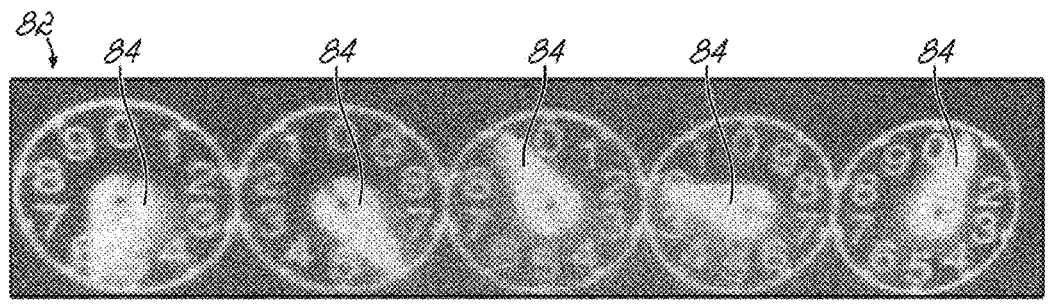
FIG. 6 is a plan view of an inverted image of the digital image of FIG. 4 after processing to convert to gray scale and inverted pursuant to the sequence of operations of FIG. 5.

One example of a process 76 which may be implemented for block 64 of process 60 will be described by reference to FIG. 5. Process 76 is provided to improve identification of the dial indicators 46 from the rest of the image 52. To that end, the digital image 52 is first converted to a gray-scale image at block 78, such as by converting one color space to another, and in this example, the colors of the digital image may be converted to varying shades of gray. The processor then inverts that converted gray-scale image at block 80 to, in effect, create an inverted or high-contrast image 82. That portion of the high-contrast image 82 related to the dials 44 is shown in FIG. 6, wherein it can be seen that the objects of interest, such as the dial indicators 46, appear to have high intensities as contrasted to most of the other objects. In that regard, in a direct image, such as image 52, the dial indicators 46 are typically are low intensity objects (i.e. dark gray/black colors), and by inverting same after conversion to a gray-scale image, the dial indicator objects in the processed image may be high intensity objects (e.g., colors close to white as at 84 in FIG. 6).

Process 76 continues to block 86 to apply a morphological filter to the inverted image 82 such that smaller objects of high intensities and low intensities may be removed from the image, where these smaller objects typically comprise objects not needed for determining the utility meter reading. Examples of such unnecessary objects include the pins 47 attaching a dial indicator 46 to a dial 44 and the identifying indicia 48 to name a few. The morphological filtering advantageously utilizes a defined structuring element which operates to smooth objects smaller than the defined structuring element, thereby producing a smoothed image, where the smaller objects of high and low intensities have been removed, which provides an improved digital image for analysis to determine the dial indicator objects.

A top-hat transform is applied to the smoothed image at block 90 to produce a background image which is subtracted from the smoothed image to produce a transformed image from which the background has been effectively removed from the smoothed image, thereby leaving primarily only objects representative of the dial indicators 46 and further removing objects that are not needed to determine the meter reading. For example, an object associated with glare from lighting in the digital image 52 may be removed from the transformed image by subtracting the background image from the smoothed image. As such, applying the top-hat transform to produce the background image and subtracting the background image from the smoothed image to produce the transformed image generally serves to correct objects caused by uneven illumination in the digital image 52.

Figure 7:
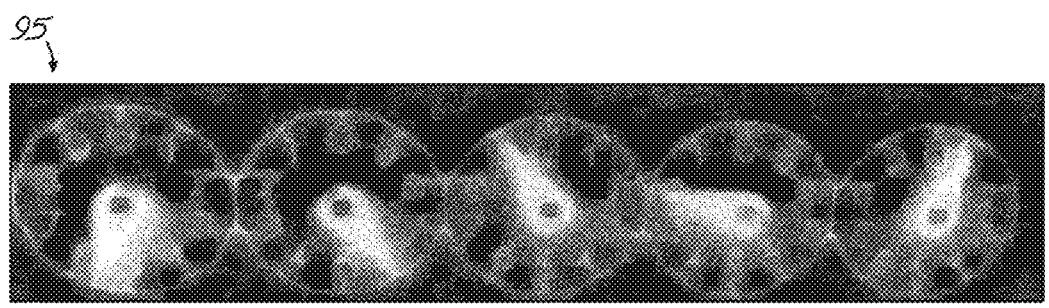
FIG. 7 is a plan view of an eroded image of the inverted image of FIG. 6 after further processing with a morphological filter, a top-hat transform, normalizing, and eroding pursuant to the sequence of operations of FIG. 5.

As a result of the processing at block 90, the intensity of objects in the transformed image decreases as compared to the original digital image 52 such that the transformed image may, when viewed, actually appear rather dark. To increase the overall brightness of the transformed image, which aids in identifying the dial indicator objects, the processor 18 normalizes the intensities of objects in the transformed image at block 92, and the result is then eroded at block 94 so as to reduce the boundaries of objects therein. This has the advantage of removing thin objects (i.e., objects having narrow areas) and helps to separate object boundaries that may have been blurred together when the digital image 52 was captured and/or from previous processing steps. Thus, additional unneeded objects may be removed, and the boundaries of the dial indicator objects may be further refined. An example of an eroded image 95 following from the results of block 94 is shown in FIG. 7.

Figure 8:
FIG. 8 is a plan view of a bi-level image of the eroded image of FIG. 7 after further processing with a threshold filter pursuant to the sequence of operations of FIG. 5.

The process 76 concludes with block 96 at which a threshold filter is applied to the eroded image 95 whereby intensity values of the pixels of each object are set to one of two values: either the intensity value associated with a black color, or the intensity value associated with a white color to thereby produce a bi-level (e.g., binary, black and white) image 98, an example of which is shown in FIG. 8. In the embodiment shown, the pixels of the dial indicator objects are set to white (i.e. a high intensity value) and the background and some other unneeded objects are set to black (i.e. a low intensity value).

The results from process 76 may then be utilized at block 66 of process 60 (FIG. 3) to identify the remaining objects and identify therefrom which are the dial indicators 46. One example of a process 100 which may be implemented at block 66 is described with reference to FIG. 9. In that regard, image processing functions configured to be executed to identify objects in a digital image generally identify objects by determining intensity boundaries between neighboring pixels in the digital image. As such, processor 20 operates under the software of app 35 at block 102 to determine where the intensity value of neighboring pixels in the bi-level image 98 vary beyond a desired threshold, with those boundaries being analyzed to determine whether they associate with other intensity boundaries, thereby defining regions enclosed by the boundaries. The enclosed regions make up the various objects.

After defining the various objects at block 102, processor 20 executes functions configured to analyze those objects and determine one or more geometric characteristics thereof at block 104. Geometric characteristics of the identified objects that may be determined include, for example, the perimeter of the object (defined by the boundaries enclosing the object), the enclosed area of the object, the number of vertices of the object, eccentricity of the object, center of mass of the object, and/or the image moment of the object. The geometric characteristics are then compared at block 106 to expected ranges of the geometric characteristics of a dial indicator object, with those objects having geometric characteristics in the expected ranges being identified as dial indicator object candidates. The identified dial indicator object candidates are then analyzed to determine a centroid and endpoint of each dial indicator object candidate at block 108. The processor 20 then analyzes the centroids and/or endpoints of the dial indicator object candidates at block 110 to thereby identify the dial indicators 46 from the digital image 52.

In that regard, it will be appreciated that a digital image may be defined on a two-dimensional coordinate system comprising x (horizontal) and y (vertical) axes. In some embodiments, the centroids of the dial indicator object candidates are sorted by their x-coordinate values. The processor 20 defines a horizontal bin of a desired vertical range, and the processor analyzes the y-coordinate values of the centroids to determine if the requisite number of centroids occur in the horizontal bin. The requisite number of centroids varies depending on how many dials 44 are configured on the utility meter 40. For example, in a utility meter 40 comprising five dials as seen in FIGS. 2A and 4, the processor would determine whether five y-coordinate values occur within the horizontal bin. As such, in some embodiments, the processor 20 generates a horizontal bin of a desired range, where the range also depends on the spacing between dials 44 on the utility meter 40.

The processor 20 may select a first centroid having an x-coordinate value furthest to the right in the digital image 52, and may determine whether the desired number of centroids occur within a given horizontal distance (i.e. the size of the horizontal bin) of the first centroid. If the desired number of centroids occur within the given horizontal distance, the processor 20 determines whether the centroids within the horizontal range are approximately evenly spaced, and if both conditions are met, the processor 20 identifies the objects corresponding to the centroids within the horizontal range as the dial indicator objects. The processor 20 may perform this analysis for each centroid beginning with the centroid having the x-coordinate value furthest to the right (or to the left) proceeding through the adjacent centroids until the conditions are met to determine the dial indicator objects. Those objects are identified or determined as the dial indicators 46.

At block 68 of process 60 (FIG. 3), the identified dial indicators 46 are then analyzed to determine the value of the dial indicators 46, i.e., the numbers they are each pointing to on their respective dials 44. In that regard, the processor 20 may undertake at block 68 the process 120 of FIG. 10 in which the centroids and endpoints of the dial indicator objects are analyzed to determine a dial indicator angle associated with each dial indicator object at block 122. The dial indicator angle will correlate to the number to which each respective dial indicator 46 is pointing to thus provide the value of each dial indicator at block 68. The meter reading may then be generated therefrom at block 70 of process 60 as above-mentioned.

Analyzing the centroids and/or endpoints of each dial indicator object candidate includes, for example determining whether centroids of two or more dial indicator object candidates are collinear, determining whether the end-point of a candidate object is an expected distance from the centroid of the candidate object, and/or determining whether centroids of three or more dial indicator object candidates are spaced equally distant from each other. A vector (not shown) may be defined for each identified dial indicator object, the vector passing through the centroid and end point of each identified dial indicator object, and determining the value of each dial indicator may be based at least in part on the defined vector for each identified dial indicator object. For example, a slope associated with each vector may be determined, and the value of each dial indicator object may be based at least in part on the determined slope. An angle of rotation of each dial indicator may be determined, where the rotation point may be defined at the centroid of each dial indicator object, and the end point of the dial indicator object defines the rotational arm. As each dial indicator 46 rotates 360° about the associated dial 44 of the utility meter 40, an angle of rotation for each dial indicator 46 may be determined based on the circular path of rotation thereof.

Figure 11:
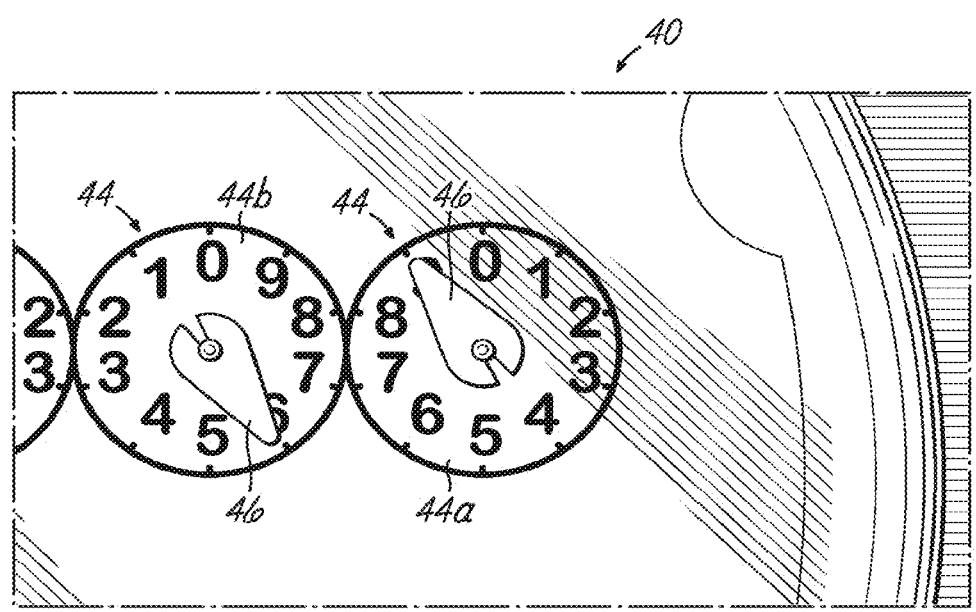
FIG. 11 is a view of a portion of the exemplary analog utility meter of FIG. 2A.

Moreover, and with reference to FIG. 11, as those skilled in the art will recognize, the plurality of dials 44 of a utility meter 40 are generally related such that a full 360° rotation of the dial indicator 46 on a first dial 44*a* corresponds to a 36° rotation of the dial indicator 46 of a second dial 44*b* being immediately to the left of the first dial 44*a*. As such, in some embodiments, determining a value associated with the second dial 44*b* may be based at least in part on the determined value of the first dial 44*a*. Therefore, in some embodiments, if the value of the second dial 44*b* is between two values, i.e., analysis of the dial indicator 46 of the second dial 44*b* indicates that the dial indicator 46 is between two values on the dial, the value associated with the first dial 44*a* may be used to accurately determine the value of the second dial 44*b*. For example, if the dial indicator 46 of the first dial 44*a* was pointed at three (3) and the dial indicator of the second dial 44*b* was between five (5) and six (6), the value determined for the second dial 44*b* would be five (5), not six (6) based on the position of the first dial 44*a*.

Figure 12:
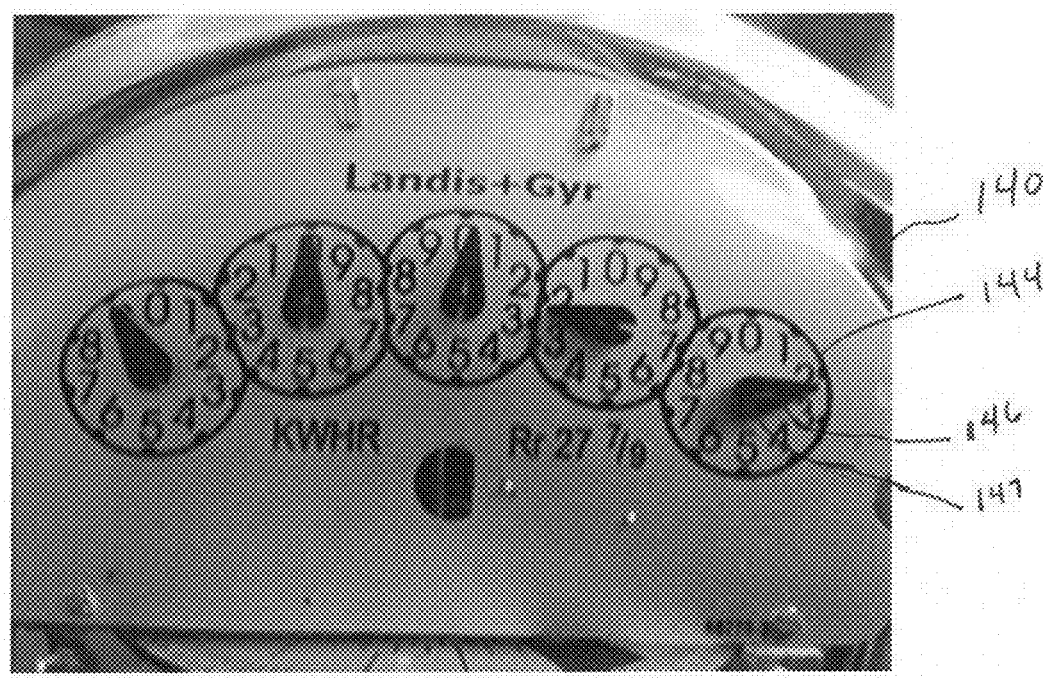
FIG. 12 is a plan view of a portion of another received digital image showing the dials of the utility meter.
Figure 13:
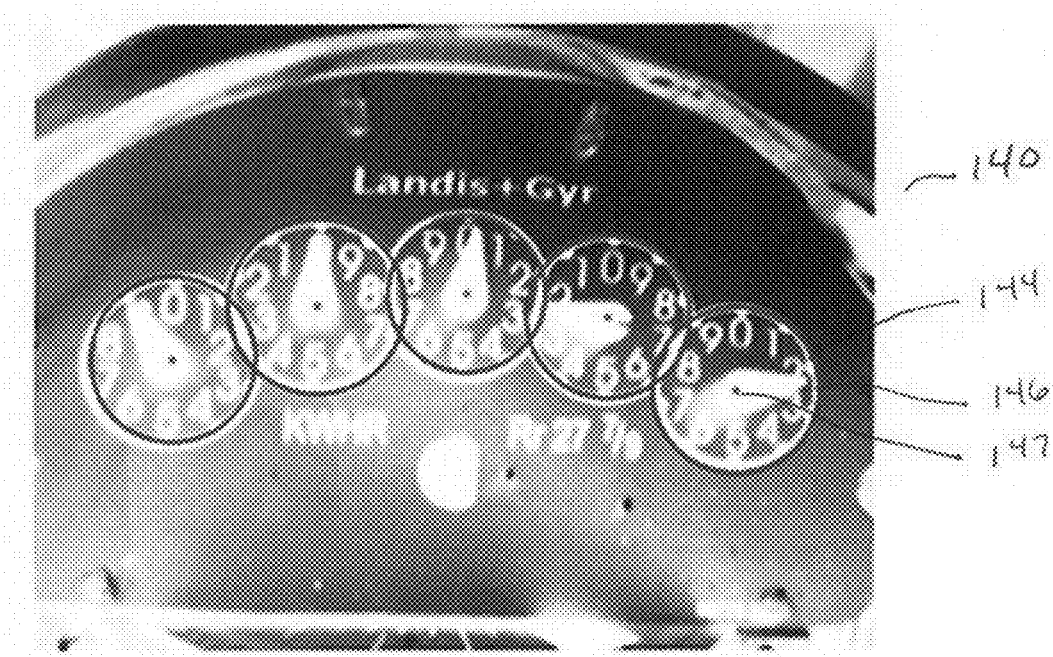
FIG. 13 is a plan view of the digital image of FIG. 12 after partial processing of the image.

Referring now to FIGS. 12 and 13, another analog utility meter 140 is illustrated. As shown in FIG. 12, the analog utility meter 140 includes a plurality of dials 144 each having a dial indicator 146 which rotates driven by an axial pin 147. The dials 144 and dial indicators 146 operate in the same manner as previously discussed, with the dial indicators 146 rotating either clockwise or counterclockwise depending upon the configuration of the particular analog utility meter. The angular relationship of each dial indicator 146 correlates to the amount of utility consumed, such as by pointing to respective numbers about the dial 144. The meter 140 typically also includes identifying indicia, such as a serial number or the like.

In contrast to the meter 40 shown in FIG. 2A, the meter 140 shown in FIGS. 12 and 13 is configured with the dials 144 arranged along an arc. The configuration of the dials is a predetermined patter corresponding to a known utility meter configuration allowing the dials to be recognized by the app 35 from a captured digital image. For example, the centroids of the plurality of dials 144 define an arc having a defined radius. In use, when the app 35 is activated, the individual 14 holds the smart phone 10 so as to aim the digital camera 16 thereof at the dials 144. The individual 14 may position the smart phone 10 such that he dials 144 are visible within a bracketed image area, or alternatively the digital image may capture the plurality of dials without requiring user alignment to a bracketed image area. As previously discussed, the processor 20 of the smart phone 10 utilizing the program code of the app 35 to analyze the received digital image to identify the dial indicators in the digital image and analyzes the identified dial indicators to determine a value of each dial. Referring to FIG. 13, the digital image is shown partially processed with the dials 144 and centroids or axial pins of the dials identified. In this manner, the analog utility meter 140 can be read with the smart phone 10 and the app 35 in the same manner as previously discussed for other utility meters with dials arranged in a horizontal configuration.

Figure 14:
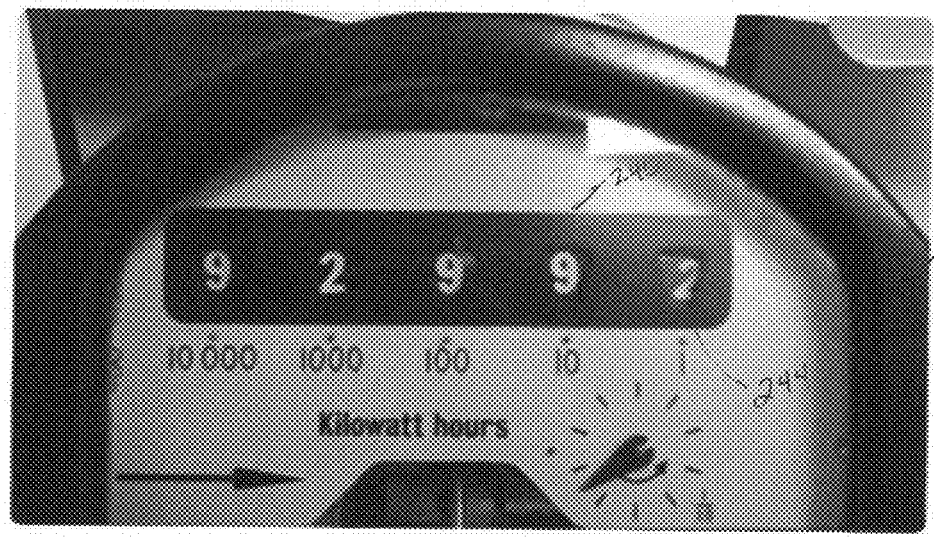
FIG. 14 is a plan view of another received digital image showing a utility meter.
Figure 15:
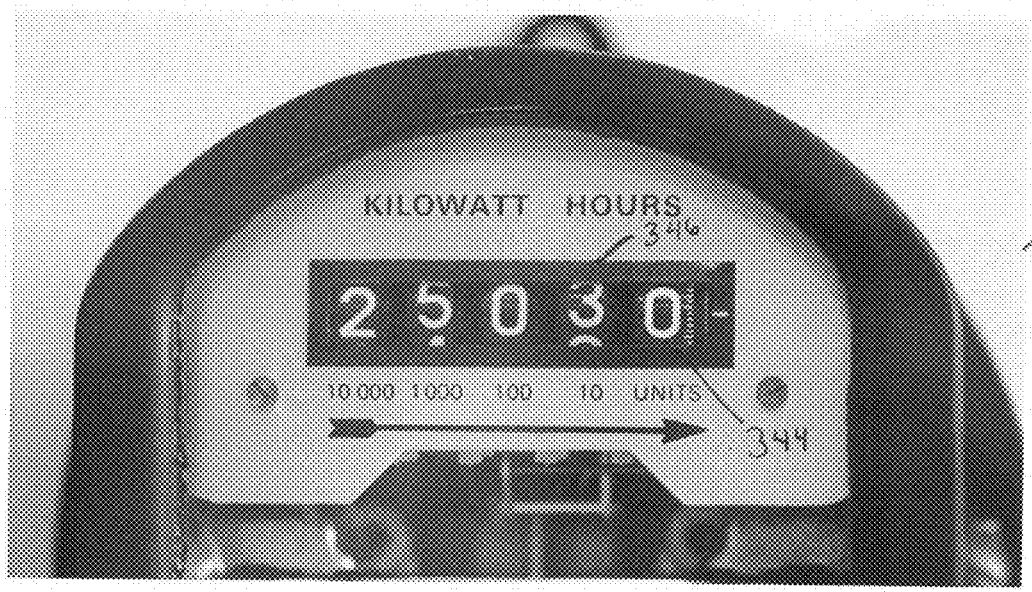
FIG. 15 is a plan view of yet another received digital image showing a utility meter.

Referring now to FIGS. 14 and 15, embodiments of analog utility meters are illustrated with scrolling dials. These utility meters may generally be referred to as scrolling dial utility meters. As shown in FIG. 14, the scrolling utility meter 240 includes a plurality of scrolling dials 244 each representing one digit of the meter value. The meter 240 includes five scrolling dials 244, however other embodiments may include a different number of dials as desired. Each scrolling dial 244 is configured to rotate such that a value from 0 to 9 is illustrated in viewing window, with the value visible being the current value of the individual dial. The meter 240 is configured with dials 244 that scroll horizontally, i.e. the dials rotate on an axis perpendicular to the face of the utility meter 240. In the embodiment shown in FIG. 15, the scrolling utility meter 340 similarly includes five scrolling dials 344. The dials 344 however scroll vertically, i.e. the dials rotate on an axis parallel to the face of the utility meter 340.

In an embodiment, the smart phone 10 and app 35 are configured to read the scrolling utility meter using the camera, process and wireless transceiver as previously discussed. Initially, a digital image is taken of the plurality of scrolling dials of the utility meter with the camera of the smart phone. Next, the digital image is analyzed to identify the dial indicators in the digital image. As shown, the dial indicators 246, 346 include a rectangular area through which the value of the dial is viewed. The identified dial indicators are then analyzed to determine the value of the dials using the processor of the smart phone, and the determined values may be transmitted with the wireless communication transceiver of the smart phone.

The digital image of the scrolling utility meter 240 may be analyzed by the processor using each of the functions and methods previously discussed to identify the dials and dial indicators within the digital image. In some embodiments, analyzing the identified dial indicators to determine a value of the dials also includes applying optical character recognition to determine the value of the dials. For example, once the dial indicators 246 are identified, the values wholly within the visible area of the dial indicator may be determined using an optical character recognition function of the app 35. In some embodiments, analyzing the identified dial indicators to determine a value of the dials also includes applying optical character recognition to determine partial characters and extrapolating from the partial characters to determine the value of the dials. For example, as shown in FIG. 14, the right most dial indicator includes a partially visible numeral "2" due to the partial rotation position of the dial. The optical character recognition function of the app 35 may be used to identify the visible portion of the dial, which may then be extrapolated to determine the actual value of the dial. Similarly, in FIG. 15, the second and fourth digits are partially rotated. The optical character recognition function may be used to detect the partial characters and to extrapolate from the partial characters to determine the value of the dials. In yet other embodiments, the optical character recognition function may be configured to determine the value of dials midway between two characters, such as when the top of a "4" and the bottom of a "5" are visible, and to properly determine the value of the dial. In this manner, the smart phone 10 and app 35 previously discussed may be used to read analog utility meters with rotatable dials, analog utility meters with scrollable dials, both or a combination.

Those ordinarily skilled in the art can readily develop appropriate software for the app 35 based on use of image processing functions from known libraries of image processing functions. One example is the Open Source Computer Visions or OpenCV library originally authored by the Intel Corporation of Mountain View, Calif., USA, and currently available under Berkeley Software Distribution (BSD) License at the following url: http://sourceforge.net/projects/opencvlibrary. Particular OpenCV functions which may be used in the app 35 include, by way of example, 'cvCvtColor' as part of block 78; 'cvNot' as part of block 80; 'cvMorphologyEx' as part of block 86; 'cvMorpohologyEx( . . . CV_MOP_TOPHAT)' and/or 'cvSub' as part of block 90; 'cvNormalize' as part of block 92; 'cvErode' as part of block 94; 'cvThreshold' as part of block 96; 'cvFindContours' as part of block 102, 'cvContourPerimeter'; 'cvContourArea'; 'cvApproxPoly'; 'cvDrawContours'; and/or 'cvMoments' at blocks 104 and/or 106; and/or 'cvConvexHu112' at block 108.

Moreover, those ordinarily skilled in the art can readily develop an appropriate software user interface consistent with embodiments of the invention to automate some operations performed by the device and/or allow a user to input relevant data to the device and/or make selections from user interface menus for reading the utility meter. As software user interfaces are generally known in the relevant field, a user interface will only be briefly discussed hereafter. For example, an app 35 loaded on a smart-phone consistent with the invention may advantageously include a user interface, where the user interface allows a user to make selections related to reading a utility meter via menus generated by the user interface. For example, the user may select from a list the relevant utility service provider. Advantageously, user selection of a particular utility service provider may cause the utility meter reading to be transmitted to a specific communication network address. Moreover, the number of dials on a utility meter depends on the type of utility the meter is measuring. As such, the user interface may allow a user to select the type of utility that a meter measures, and in response to the user selection of the type of utility, analysis of the digital image adjusts to identify the appropriate number of dial indicators. Furthermore, an app executing on a smart-phone typically allows a user to capture a digital image while executing the app 35 on the smart-phone. Alternatively, the user interface may allow a user to select and load a previously captured digital image from memory associated with the smart-phone.

An exemplary set of code listings of the app 35 are included in the appendix of U.S. application Ser. No. 13/222,255. It will be appreciated, however, that other functions and software coding may be utilized as generally recognized and understood by those skilled in the art with the benefit of the features and advantages of the invention as hereinabove described.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. Those skilled in the art will recognize that the embodiments illustrated herein are merely exemplary and that other alternative hardware and/or software environments, and different numbers and configurations of hardware resources, may be used without departing from the scope of the invention. In that regard, "processor" refers to practically any computing device, such as a microprocessor, microcontroller, bit slice, computer, or the like and may be singular or plural, with execution of the various steps performed locally or distributed. Similarly, it will be appreciated that the flow charts of FIGS. 3, 5, 9, and 10 are merely exemplary to illustrate sequences of operations consistent with some embodiments of the invention. Those skilled in the art will recognize that the sequences of operations illustrated in the blocks of those flow charts may be removed, added to, and/or performed in alternative sequences without departing from the scope of the invention.

By way of example, while a smart phone 10 is a particularly advantageous implementation of the present invention, other mobile computing devices could be employed. Further, the digital image 52 can be captured by a stand-alone digital camera (not shown), and then transferred to a separate computer, either wirelessly or with a cable. The separate computer could be a customer's computer (not shown) where the image is processed and analyzed as described herein, and the results communicated to the server 55. Or the computer could be the server 55, which receives the image from the digital camera (not shown) or from an intermediary computer such as a customer's computer (not shown) which itself had received the digital image 52 as described herein. In any of these situations, the processor of the computer (whether of the mobile computing device, the customer's computer, and/or the server) may be programmed to analyze the received image 52.

Additionally, while the present invention advantageously facilitates easy capture of analog meter readings and analysis thereof by which to simply, economically, and automatically obtain accurate customer-supplied meter readings without the disadvantages encountered with present approaches, meter readers may also take advantage of the present invention, such as with an appropriate programmed mobile computing device 10. Similarly, while the invention has been described in the context of a fully functioning smart phone 10 with the app 35, it will be appreciated that the various embodiments of the programming for implementing the invention are capable of being distributed as a program product in a variety of forms, and that the invention applies equally regardless of the particular type of computer readable media used to actually carry out the distribution. Examples of computer readable media include but are not limited to physical and tangible recordable type media such as volatile and nonvolatile memory devices, floppy and other removable disks, hard disk drives, optical disks (e.g., CD-ROM's, DVD's, etc.), among others.

The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A method of reading a utility meter with a mobile device having a camera, a processor, and wireless communication transceiver associated therewith, the utility meter having a plurality of scrolling dials, the plurality of scrolling dials each having a scrolling dial indicator, the method comprising:
    taking a digital image of the plurality of scrolling dials of the utility meter with the camera of the mobile device;
    analyzing the digital image to identify the dial indicators in the digital image;
    analyzing the identified dial indicators to determine a value of the dials with the processor of the mobile device; wherein analyzing the digital image to identify the dial indicators in the digital image includes converting the digital image to a gray-scale image, inverting the gray-scale image to produce a high contrast image, applying a morphological filter to the high contrast image to produce a smoothed image, applying a top-hat transform to the smoothed image to produce a transformed image, eroding boundaries of regions in the transformed image to produce an eroded image, applying a threshold filter to the eroded image to produce a bi-level image, and analyzing the bi-level image to identify the dial indicators in the digital image with the processor of the mobile device; and
    transmitting the determined value with the wireless communication transceiver of the mobile device, whereby the utility meter is read with the mobile device.

2. The method of claim 1, wherein analyzing the digital image to identify the dial indicators in the digital image includes applying a threshold filter to the digital image to produce a bi-level image, and analyzing the bi-level image to identify the dial indicators in the digital image with the processor of the mobile device.

3. The method of claim 1, wherein analyzing the digital image to identify the dial indicators in the digital image includes determining contours in the digital image with the processor of the mobile device.

4. The method of claim 1, wherein analyzing the identified dial indicators to determine a value of the dials includes applying optical character recognition to determine the value of the dials.

5. The method of claim 1, wherein analyzing the identified dial indicators to determine a value of the dials includes applying optical character recognition to the identified dial indicators to determine partial characters and extrapolating from the partial characters to determine the value of the dials.

6. The method of claim 1, wherein the determined value is transmitted to a server of a utility supplier.

7. The method of claim 6, the method further comprising transmitting the digital image with the wireless communication transceiver to the server of the utility supplier.

8. A method of reading a utility meter with a mobile device mobile device having a camera, a processor, and wireless communication transceiver associated therewith, the utility meter having a plurality of scrolling dials, the plurality of scrolling dials each having a scrolling dial indicator, the method comprising:
    receiving a digital image of the plurality of scrolling dials of the utility meter taken with the camera of the mobile device;
    analyzing the digital image to identify the dial indicators in the digital image; wherein analyzing the digital image to identify the dial indicators in the digital image includes converting the digital image to a gray-scale image, inverting the gray scale image to produce a high contrast image, applying a morphological filter to the high contrast image to produce a smoothed image, applying a top-hat transform to the smoothed image to produce a transformed image, eroding boundaries of regions in the transformed image to produce an eroded image, applying a threshold filter to the eroded image to produce a bi-level image, and analyzing the bi-level image to identify the dial indicators in the digital image; and
    analyzing the identified dial indicators to determine a value of the dials.

9. The method of claim 8, wherein analyzing the digital image to identify the dial indicators in the digital image includes determining contours in the digital image.

10. The method of claim 8, the method further comprising transmitting the digital image with the wireless communication transceiver to a server of a utility supplier.

11. The method of claim 10, wherein analyzing the digital image to identify the dial indicators in the digital image includes analyzing the digital image with the server of the utility supplier.

12. A mobile device configured to read a utility meter having a plurality of scrolling dials each having a scrolling dial indicator, the mobile computing comprising:
    a housing;
    a processor, a memory, and a camera associated with the housing; and
    an application resident in the memory and configured to be executed by the processor to cause the processor to:
        take a digital image of the plurality of scrolling dials of the utility meter with the camera of the mobile device;

analyze the digital image to identify the dial indicators in the digital image;

analyze the identified dial indicators to determine a value of the dials with the processor of the mobile device; and transmit the determined value with the wireless communication transceiver of the mobile device, whereby the utility meter is read with the mobile device;

wherein the application is further configured to cause the processor to convert the digital image to a gray-scale image, invert the gray-scale to produce a high contrast image, apply a morphological filter to the high contrast image to produce a smoothed image, apply a top-hat transform to the smoothed image to produce a transformed image, erode boundaries of regions in the transformed image to produce an eroded image, apply a threshold filter to the eroded image to produce a bi-level image, and analyze the bi-level image to identify the dial indicators in the digital image with the processor of the mobile device.

13. The device of claim 12, wherein the application is further configured to cause the processor to determine contours in the digital image with the processor of the mobile device.

14. The device of claim 12, wherein the application is further configured to cause the processor to transmit the digital image with the wireless communication transceiver to a server of a utility supplier.

* * * * *